United States Patent [19]
Dibbern, Jr. et al.

[11] Patent Number: 5,873,282
[45] Date of Patent: Feb. 23, 1999

[54] ARMATURE SHAFT DEFLECTION LIMITER

[75] Inventors: John E. Dibbern, Jr., Street; Lynn E. Lentino, Westminster; William R. Stumpf, Kingsville, all of Md.

[73] Assignee: Black & Decker Inc., Newark, Del.

[21] Appl. No.: 315,208

[22] Filed: Sep. 29, 1994

[51] Int. Cl.[6] .................................................. F16H 1/12
[52] U.S. Cl. ........................ 74/421 A; 74/421 R; 30/391
[58] Field of Search ............................ 74/421 A, 421 R; 30/391; 384/624; 310/83

[56] References Cited

U.S. PATENT DOCUMENTS

| | | |
|---|---|---|
| Re. 25,960 | 2/1966 | Caley et al. . |
| 2,801,548 | 8/1957 | Bade ..................................... 74/421 R |
| 3,133,452 | 5/1964 | Coutant et al. ....................... 74/421 R |
| 3,303,366 | 2/1967 | Elson et al. . |
| 3,818,778 | 6/1974 | Seeley et al. . |
| 3,873,862 | 3/1975 | Butler . |
| 3,973,449 | 8/1976 | Berlinger, Jr. . |
| 4,011,774 | 3/1977 | Moosberg ............................. 74/421 R |
| 4,399,380 | 8/1983 | Hiramo . |
| 4,743,174 | 5/1988 | Sato et al. ............................. 74/321 R |
| 4,802,372 | 2/1989 | Harrod et al. . |
| 4,848,933 | 7/1989 | Bigo et al. ............................ 74/421 R |
| 4,856,394 | 8/1989 | Clowers ................................. 30/391 X |

FOREIGN PATENT DOCUMENTS

| | | |
|---|---|---|
| 0082375 | 6/1983 | European Pat. Off. . |
| 4116202 | 11/1992 | Germany . |
| 49-60085 | 11/1974 | Japan . |
| 2182499 | 5/1987 | United Kingdom . |

OTHER PUBLICATIONS

Prior Art Figs. 1 and 2 (Ex. A).
Fig. 8 of the present application (Ex. B).

Primary Examiner—Charles A. Marmor
Assistant Examiner—David Fenstermacher
Attorney, Agent, or Firm—Dennis A. Dearing; John D. Del Ponti; Bruce S. Shapiro

[57] ABSTRACT

An apparatus for limiting deflection of the armature shaft 38, 38', 103 of an electrically powered tool, such as a hand held saw 10 or drill 91. In saw 10, the armature shaft 38, 38' extends as a cantilever from the motor 14 and has a geared connection 58, 60 to an arbor 44 for driving the saw blade 18. An arrangement for limiting the deflection of the armature shaft 38, 38' comprises a pilot member 72, 84 and a socket 68, 82 associated, respectively, with one and the other of the armature shaft and a motor housing supported wall. The socket 68, 82 is larger in cross-section than that of the pilot member 72, 84 and limits transverse deflection of the armature shaft 38, 38' away from its axis of rotation A. If the saw 10 stalls in the material being cut, force is transmitted from the geared connection 58, 60 to the armature shaft 38, 38'. The socket 68, 82 and pilot member 72, 84 permit the armature shaft 38, 38' to deflect a predetermined amount to counteract torques resulting from the geared connection 58, 60. In one embodiment, the pilot 72 extends from the armature shaft 38 to be received in an aperture 68 formed in the housing wall 66. In another embodiment, the pilot 84 extends from the housing wall 66' to be received in a bore 82 formed in the armature shaft 38'. According to a third embodiment, in drill 91, the shaft deflection limiter is constituted by an armature shaft pilot 111 disposed in a roller bearing aperture 117.

27 Claims, 4 Drawing Sheets

ARMATURE SHAFT DEFLECTION LIMITER

FIELD OF THE INVENTION

The present invention relates generally to electrically powered tools, and more particularly, to an apparatus for limiting motor armature shaft deflection of such power tools.

BACKGROUND OF THE INVENTION

An electrically powered tool, such as a portable rotary hand held saw and the like, typically includes an electric motor for providing a source of power which is transmitted through a gear train to the saw blade or other implement for performing the intended work. As can be appreciated, there is a large amount of force exerted on the implement as it is worked through the material. This force, which is generated by the electric motor, is conducted through the gear train to the implement. Therefore, the gear train and the electric motor are necessarily designed to withstand the high stresses resulting from these forces.

The loads, and therefore the stresses, experienced by the gear train and the motor vary with the cutting conditions. When the power tool is freewheeling, i.e., the tool is operating but the implement is not cutting through material, the loading of the gear train is fairly low. When the tool is cutting easily through a piece of material, the loading of the gear train is still of fairly low magnitude. However, if the tool bogs down or "stalls" in the material, i.e., the implement is no longer moving smoothly through or is stuck in the workpiece, the loading and stresses acting on the gear train increase.

Although the implement may have "stalled" in the workpiece, the driving torque from the electric motor will continue and the force acting on the gear teeth may tend to force the gears apart and drive the armature shaft radially outwardly. If the armature shaft should deflect radially, the loading condition on the gear train will be further aggravated because the driving connection thereon will be via the tips of the gear teeth instead of against the faces of the gear teeth.

Therefore, to ensure that the gear teeth do not fracture or otherwise fail under such loading conditions, and hence, to ensure a long reliable life for the power tool, the gears are made from hardened steel. Hardened steel gears, however, are typically more difficult to manufacture and are more expensive as compared to other types of gears such as powdered metal gears. In addition to providing for hardened steel gears, care must also be taken to provide enhanced support bearings for the various elements of the power tool gear train to ensure that they too are not damaged by the adverse loading conditions, and particularly, by shaft deflection.

In U.S. Pat. No. 3,973,449, it has been suggested that armature shaft deflection may be limited by supporting the distal end of the armature shaft in a bearing. However, this solution has been found to suffer from a number of disadvantages. The armature shaft is typically supported in a pair of bearings located, respectively, at each end of the armature winding. If a third bearing is added to support the distal end of the armature shaft, the armature shaft would then be supported in three bearings at spaced locations. Because of the tolerances inherent in the design of power tools, the accurate alignment of a single shaft in three spaced bearings is difficult. Misalignment will, of course, cause the development of friction and excessive heat in the bearings, leading to poor performance and potential failure of the device. Furthermore, the supporting of the distal shaft end in a bearing is difficult because the bearing is frequently located adjacent to an external housing wall typically made of plastic. The friction and heat generated in the bearing can lead to bearing failure and can lead to melting of the plastic housing in which the bearing is supported. Accordingly, it is, therefore, desirable to develop an improved durable mechanism for limiting shaft deflection with higher tolerances.

SUMMARY OF THE INVENTION

The present invention is directed to an apparatus for alleviating this type of loading condition by limiting deflection of the armature shaft of the electrically powered tool. The shaft deflection limiter may be designed in a variety of ways. In a first preferred embodiment according to this invention, the armature shaft extends as a cantilever from the motor, a driven shaft has a first end portion journalled for rotation within a sleeve member and connected to a saw blade, and power is transmitted from the motor to the saw blade via a geared connection operating between the armature shaft and the driven shaft.

According to this embodiment, a plate member is provided with a first and a second aperture and supported in the motor housing, the sleeve member is disposed at least in part in the first aperture, and the armature shaft is formed with a reduced diameter pilot portion which is disposed at least in part in the second aperture. The apertures are located so as to assist in maintaining the axes of the two shafts in generally parallel relation. The cross-section of the first aperture and the sleeve member are dimensioned so as to provide a snug fit therebetween. The pilot portion is slightly smaller in diameter than that of the second aperture such that during normal operation of the power tool, there is a small clearance between the pilot portion and the aperture.

When a severe loading condition exists, causing the armature shaft to deflect, the pilot portion will move towards, and in the worst case, into engagement with the wall of the aperture. That is, deflection of the pilot portion is limited to an amount equal to the small clearance between the pilot portion and the aperture. In this manner, the gears of the power tool are limited from separating, the gear teeth loads are distributed over the face of the gear teeth, not at the tips, and the gear teeth bending load is not adversely increased.

In a second preferred embodiment according to this invention, a cylindrical boss or pilot extends axially from the plate member, and the armature shaft is formed with a blind axial bore. The cross-sectional diameters of the boss and the bore are such that a small clearance is formed therebetween and the boss will project into the axial bore. The boss could be integrally formed with or secured to the plate member.

Under normal operating conditions, the small clearance is maintained between the boss and the bore. However, if loading conditions rise to a level causing deflection of the armature shaft, the wall of the bore will deflect, and in the worst case, into contact with the boss and the boss will prevent further deflection of the armature shaft.

In a third preferred embodiment according to the invention, the shaft deflection limiter comprises (1) a bearing supported in a tool housing and (2) a pilot formed on the distal end of the armature shaft and disposed in the bearing aperture. The outer diameter of the pilot and the inner diameter of the bearing are chosen such that there is a small clearance formed in the bearing aperture between the pilot and the inner diameter of the bearing during normal operation of the power tool. This embodiment provides reduced friction and heat generation when the shaft is adversely loaded and the pilot engages the bearing.

DETAILED DESCRIPTION OF THE INVENTION

Figure 1:
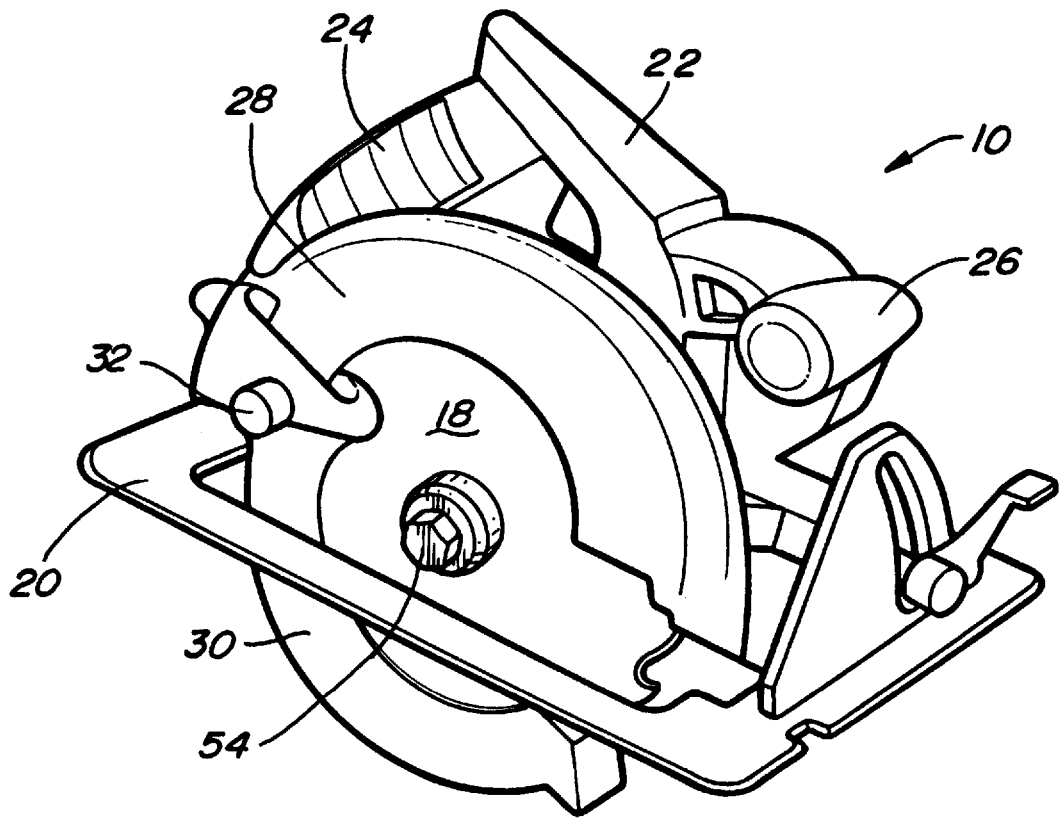
FIG. 1 is a perspective view of a typical portable electric saw configured with an armature shaft deflection limiter according to a first preferred embodiment of the present invention.
Figure 7:
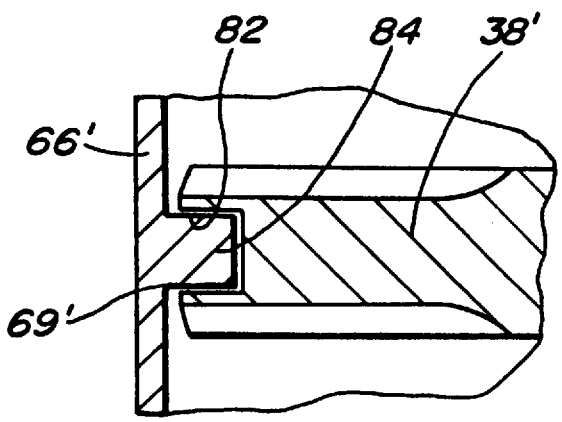
FIG. 7 is a partial cross-sectional view of the electric saw shown in FIG. 1 configured with an armature shaft deflection limiter according to a second preferred embodiment of the present invention.
Figure 8:
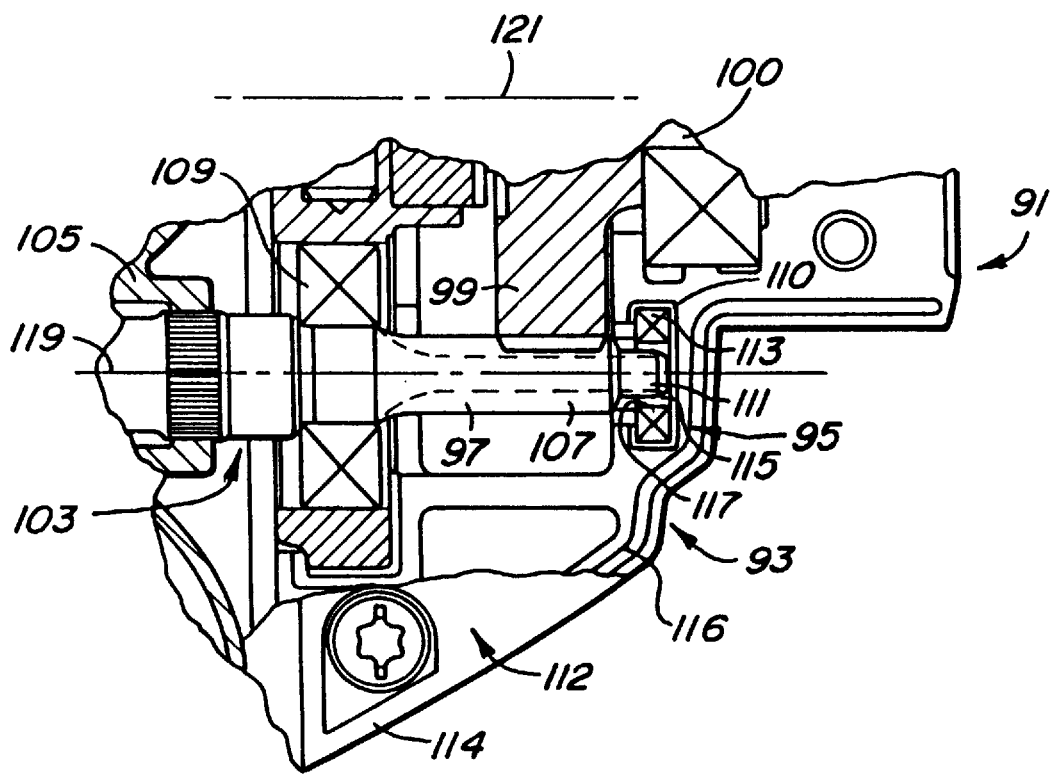
FIG. 8 is a fragmentary cross-sectional view of a hammer drill including a gear train with an armature shaft deflection limiter according to a third preferred embodiment of the present invention.

The present invention is described in terms of preferred embodiments adapted to a portable hand held rotary electric saw (FIGS. 1–7) and to a hammer drill (FIG. 8). It will, however, be readily apparent to one skilled in the art that its teachings will find broader applications than those described herein, and particularly, in the field of electrically powered tools.

Turning now to the drawings, FIGS. 1–6 show a typical portable electric saw 10 configured with a deflection limiter according to the present invention. The portable saw 10 includes a motor housing 12 which forms an interior chamber, an electric motor 14 supported in the chamber, a gear case 16 secured to the housing in a suitable manner, and a circular saw blade 18 connected to the motor. The portable saw 10 further includes a substantially-flat shoe plate 20 for supporting the motor housing 12 on the surface of a workpiece, a control handle 22 provided with a trigger switch 24 for energizing the unit, a front knob 26 for assisting in guiding the saw blade through the workpiece, an upper blade guard 28 and a lower guard 30 which pivots into the upper blade guard 28 upon engagement of the saw blade 18 with the workpiece. A lever 32 is conventionally provided for manually pivoting and or adjusting the lower blade guard 30.

Figure 2:
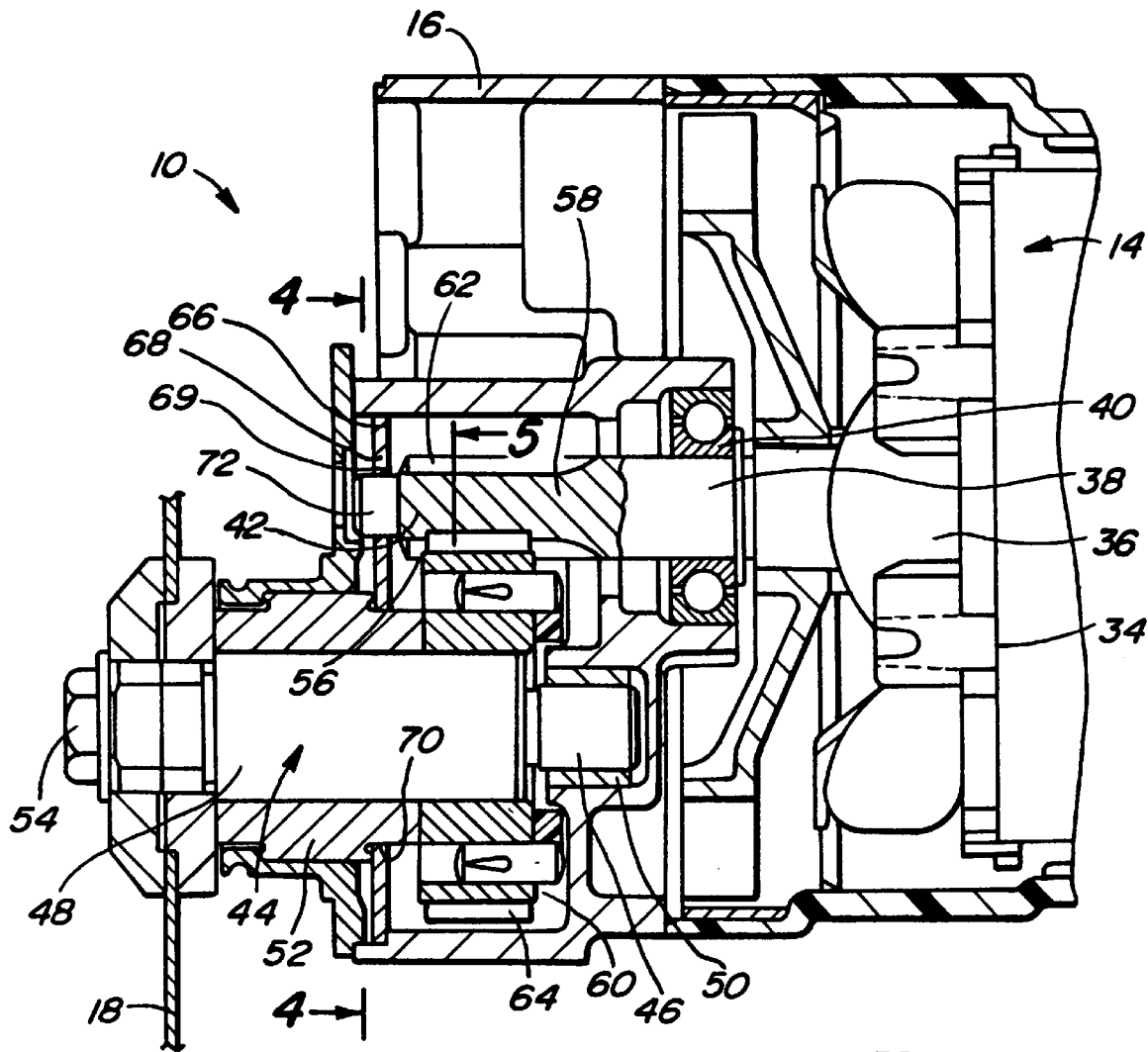
FIG. 2 is a partial cross-sectional view of the electric saw shown in FIG. 1 illustrating a gear train for transmitting torque from the armature shaft to a driven shaft.
Figure 3:
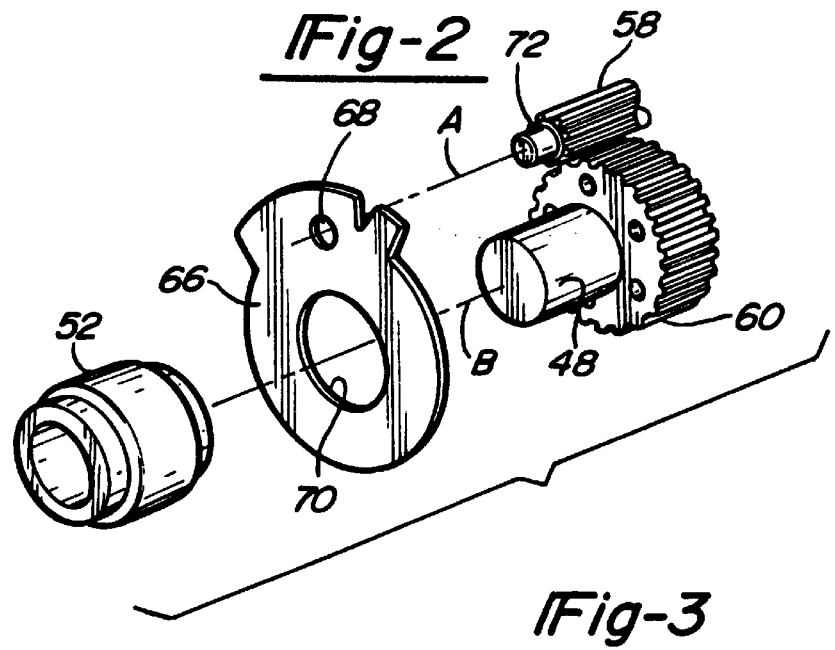
FIG. 3 is an exploded perspective view, at least in part, of the gear train, the drive shaft and the armature shaft shown in FIG. 2.

The electric motor 14 is conventional and includes a field 34 and an armature 36. As can be seen in FIG. 2, an armature shaft 38 extends in a cantilevered fashion from the armature 36 and has a first end portion supported for rotation in a stationary roller bearing 40 and a free end portion 42 spaced from the bearing as is conventional for portable saws of this type.

An arbor 44 has first and second end portions 46 and 48 with the first end portion 46 being supported for rotation in a stationary bearing 50 mounted in the gear case 16 and the second end portion 48 being journalled for rotation in a sleeve member 52. The saw blade 18 is connected to the second end of the arbor 44 so as to be in a plane substantially perpendicular to the axis of rotation of the arbor and extend below the shoe plate 20 for engaging the workpiece. As shown, the connection of the saw blade 18 to the arbor 44 is by means of a bolt assembly 54.

A gear train 56 is utilized to transmit driving torque from the motor 14 to the saw blade 18. In this regard, the gear train includes a pinion gear 58 fixedly connected to the armature shaft 38 for rotation therewith and a spur gear 60 fixedly connected to the arbor 44 for rotation therewith. The pinion gear 58 includes a plurality of radial gear teeth 62 each extending axially from the armature 36 for meshed engagement with respective helical gear teeth 64 formed about the circumference of the spur gear 60.

According to a preferred embodiment of the present invention, a plate member 66 is mounted to the gear case 16. The plate member 66 has upper and lower openings 68 and 70 and the free end portion 42 of the armature shaft 38 is formed with a reduced diameter pilot portion 72. The pilot portion 72 is generally cylindrical and extends axially from the armature shaft 38 into the upper aperture 68 formed in the plate member 64. The aperture 68 is generally circular and slightly larger in diameter than the cross-section of the pilot portion 70 whereby to form a small clearance 69 therebetween. The sleeve member 52 is generally cylindrical and the outer periphery thereof is adapted to fit snugly in the lower aperture 70 formed in the plate member 64.

In normal operation of the electric saw 10, there is no contact between the pilot portion 72 and the upper aperture 68. As will be appreciated, the upper aperture 68 will inhibit the free end portion 42 of the armature shaft 38 from undergoing deflection in a direction transverse to its axis of rotation "A" by its engagement with the pilot portion 72. Importantly, the apertures 68 and 70 in the plate member 64 cooperate to maintain the respective axes of rotation "A" and "B" of the armature shaft 38 and the arbor 44 generally parallel to one another.

Figure 6:
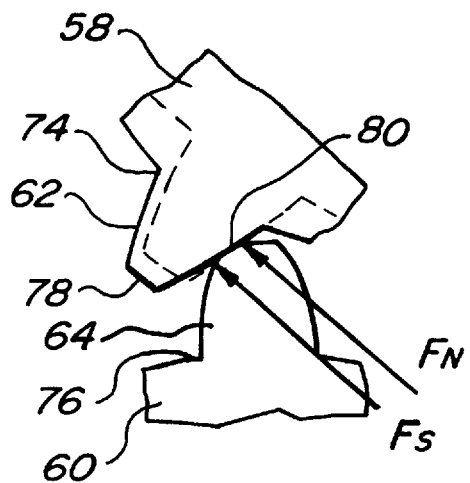
FIG. 6 is an enlarged view illustrating the loading of the gear teeth under normal operation and under an adverse condition.

As is known, the highest stresses in gear teeth occur at the point of contact between the mating gear and in the fillet at the base of the gear tooth due to the bending moment created by the contact force. With reference to FIG. 6, a force from pinion gear tooth 62 against a spur gear tooth 64 is indicated by the arrow Fn and directed against the faces of the gear teeth.

Figure 5:
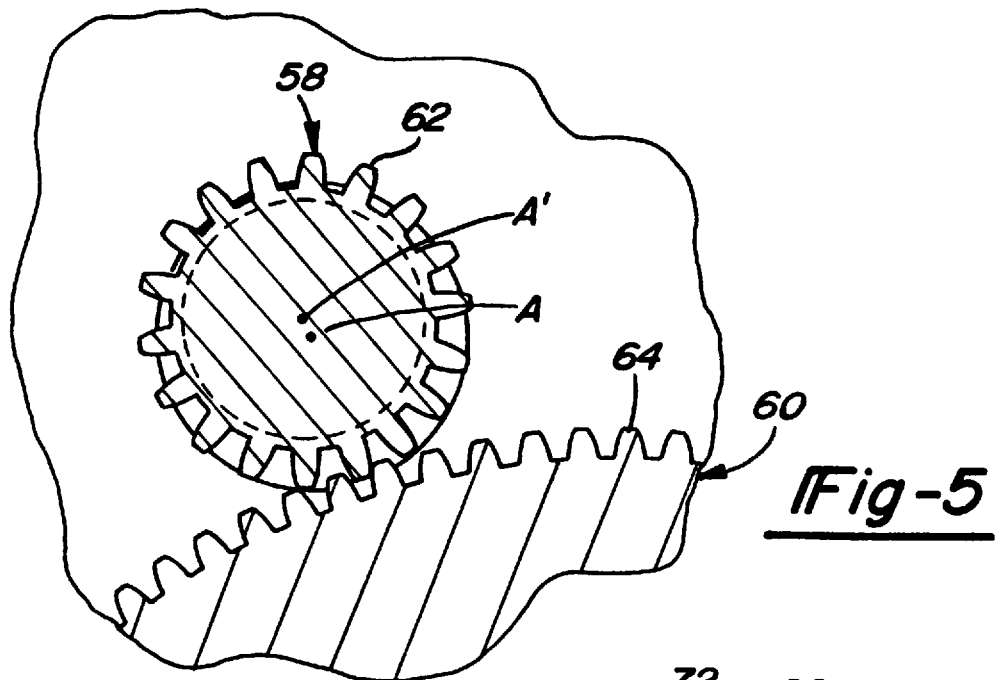
FIG. 5 is an end view taken along line 5—5 of FIG. 2 illustrating the loading of the gear teeth under an adverse condition.
Figure 4:
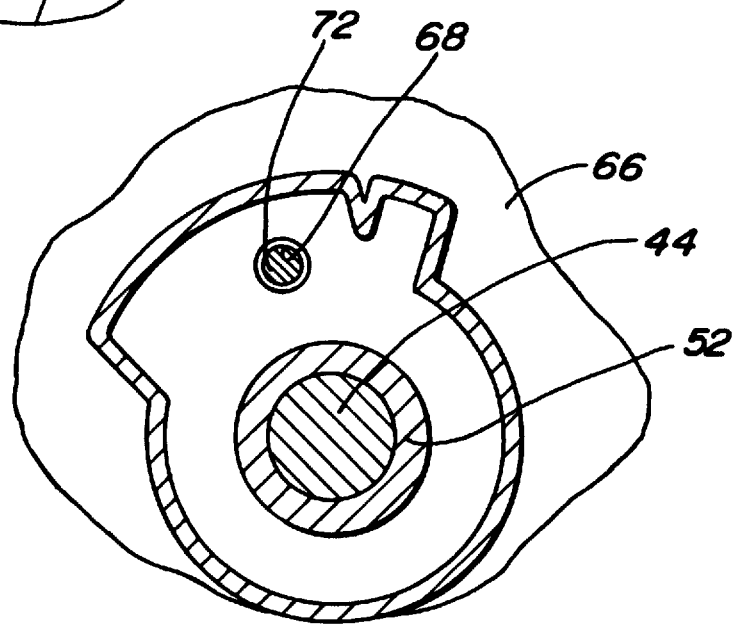
FIG. 4 is an end view taken along line 4—4 of FIG. 2.

In the event that the saw blade 18 stalls in the material, the torque delivered by the electric motor 14 will continue to act on the gear teeth 62 and 64 and tend to drive the pinion gear 58 and the spur gear 60 apart due to a component of the force opposing the engagement of the gears. The pinion gear 58 will tend to move away from meshed engagement with the spur gear 50 due to deflection of the armature shaft 38. As a result, the armature shaft 38 could tend to deflect away from the arbor 44. This situation causes a severe loading condition between the gear teeth 62 and 64. FIG. 5 illustrates the situation where the axis of rotation "A" of the armature shaft 38 moves from its original position to a new point "A'".

Under this condition, the gear teeth 60 and 62 take on the relationship shown in phantom in FIG. 6 wherein the contact force between gear 62 and 64 is now applied to the tip of the gear tooth, as indicated by the arrow Fs. Hence, the stresses in the fillets 74 and 76 of the gear teeth 62 and 64, respectively, due to the bending moment, are increased due to the greater moment arm that force Fs acts on. In addition, the contact stress is now concentrated at the tips 78 and 80 of the gear teeth 62 and 64, as opposed to being distributed over the face of the gear tooth as in normal loading conditions. Loading the tips 78 and 80 of the gear teeth 62 and 64 promotes cracking and chipping of the gear teeth while the increased moment causes increased stress at the base of the gear tooth potentially leading to fatigue fracture.

In short, repeated loading of the gear train in this fashion will ultimately lead to the failure of the gears requiring service for the power tool. Limiting deflection of the armature shaft 38 to the clearance 69 between the pilot portion 72 and the upper aperture 68 substantially maintains the pinion gear 58 in normal contact with the spur gear 60 and operates to obviate the severe loading condition described.

With reference to FIG. 7, a second embodiment of the present invention is shown. Primed reference numerals are used to identify elements which are modified from the preceding embodiment.

As can be seen in FIG. 7, an armature shaft 38' is formed with a blind axial bore 82 and a plate member 66' is formed with a generally cylindrical boss 84. The plate member 66' is suitably secured to the gear case 16 such that the boss 84 extends into the axial bore 82. The cross-section of the bore 82 is dimensioned to be slightly greater than the cross-section of the boss 84 such that a small gap 69' is defined therebetween.

In normal operation, the boss 84 does not contact the wall of the bore 82. However, under loading conditions causing deflection of the armature shaft 38', the bore 82 engages the boss 84 for preventing deflection of the armature shaft 38' and maintaining substantially normal contact between the pinion gear 58 and the spur gear 60.

While the boss 84 is shown integrally formed with the plate member 64' and generally cylindrical in cross-section, the securement and cross-section could be otherwise. For example, the boss could be separately fastened to the plate member 66'. In such manner, the amount of armature shaft deflection could be varied, depending on the model.

As will be appreciated from the foregoing discussion of the present invention, the pinion gear 58 and the spur gear 60 will no longer be subjected to adverse loading conditions. Therefore, there is no longer a need to specify hardened steel gears, which are typically more difficult and expensive to manufacture, to ensure reliable performance of the power tool. Also, the reliability of the bearings supporting the armature shaft is increased due to elimination of adverse loading due to armature shaft deflection.

In FIG. 8, a fragmentary axial cross-sectional view of a hammer drill 91 incorporating a gear train 93 with a third embodiment of a shaft deflection limiter 95 is shown. The gear train 93 comprises a pinion 97 and a spur gear 99. For simplicity, pinion 97 and spur gear 99 are illustrated as spur gears. However, helical gears are preferably used. Spur gear 99 is rotatably fixed to an output shaft 100 of hammer drill 91. Pinion 97 is integrally formed on an armature shaft 103 for a drive motor 105. Shaft 103 has a distal end 107 extending as a cantilever from bearing 109 and thus is subject to deflection under adverse loading conditions as explained in the first and second embodiments.

To prevent excessive shaft deflection, a shaft deflection limiter 95 is formed by a pilot 111 formed on distal end 107 and a roller bearing 113 for receiving pilot 111. Bearing 113 is supported in pockets 110 (only one shown) formed in each half 114, 116 of clam shell housing 112. Pilot 111 and bearing 113 are sized such that there is a small clearance 115 formed in bearing aperture 117 between the inner diameter of bearing 113 and the outer diameter of pilot 111. As an example, in one embodiment, pilot 111 is 4.5 mm in diameter, bearing aperture 117 is 5 mm in diameter and clearance 115 is 0.25 mm (radially). Clearance 115 should be dimensioned to be a minimum to permit pilot 111 to rotate freely under normal operating conditions and to engage bearing 113 only under adverse loading conditions to maintain the axis of rotation 119 of shaft 103 substantially parallel to the axis of rotation 121 of gear 99.

In accordance with the present invention as explained in the embodiments described herein, the shaft deflection limiter may be constituted by piloting the armature shaft 38, 38', 103 in an apertured plate 66, on a cylindrical boss 84, or in a roller bearing 113, respectively. The limiter may also comprise a sleeve bearing or washer substituted for bearing 113.

While specific embodiments of the invention have been shown and described in detail to illustrate the principles of the present invention, it will be understood that the invention may be embodied otherwise without departing from such principles. For example, one skilled in the art readily recognize from such discussion and from the accompanying drawings and claims that various changes, modifications and variations can be made therein without department from the spirit and scope of the invention as described in the following claims.

What is claimed is:

1. A shaft deflection limiter for a power tool which is adapted to deliver driving power from a source through a shaft having an axis and a gear train to a working implement comprising:

a member having an aperture formed therein with the aperture having a wall surface;

a pilot portion with an axis coincidental with the axis of the shaft and having a first axial end coupled to said shaft and a second axial end spaced axially from the first axial end;

the second axial end of the pilot portion being formed with an outward surface which faces away from the shaft;

the pilot portion formed with a side surface which extends between the first axial end and the second axial end thereof;

the pilot portion extending in cantilever (1) into said aperture with at least portions of the side surface of the pilot portion being adjacent to and spaced from the wall surface of the aperture under normal loading conditions on the gear train and (2) with the outward surface of the second axial end being unobstructed in an axial direction away from the shaft; and the aperture being greater in cross-section than that of the pilot portion to allow the pilot portion to freely move therewithin under normal loading conditions on the gear train and thereafter to engage the pilot portion under adverse loading conditions on the gear train and thereby limit deflection of the shaft laterally of the axis only.

2. The shaft deflection limiter of claim 1 wherein the gear train includes an arbor having an axis in parallel with the axis of the shaft and the pilot portion and the member further comprises means for limiting deflection of the arbor relative to the shaft and laterally of the axis of the arbor.

3. The shaft deflection limiter of claim 2 wherein the means for limiting deflection of the arbor relative to the shaft comprises a sleeve member fixedly positioned in the member, the arbor being journalled for rotation in the sleeve member.

4. The shaft deflection limiter of claim 1 wherein the source comprises an electric motor and the shaft is the armature shaft of the electric motor.

5. The shaft deflection limiter of claim 4 wherein the shaft includes a pinion formed integral thereto for engaging the gear train and the pilot portion is formed adjacent the pinion.

6. A shaft deflection limiter for an electrically powered tool including an armature shaft adapted for driving a gear train, the gear train including an arbor adapted for delivering driving power to an implement, the shaft deflection limiter comprising:

a pilot portion formed on the armature shaft and having a peripheral surface extending in cantilever to a free end thereof;

the free end of the pilot portion formed with an end surface facing away from the shaft;

a member having an aperture with a side wall formed therein, the member mounted adjacent the armature shaft such that the peripheral surface of the pilot portion extends into the aperture, the end surface of the free end of the shaft being unobstructed in an axial direction away from the shaft, and the aperture being sized such that a small clearance exists between the peripheral surface of the pilot portion and the side wall of the aperture under normal operating loads on the armature shaft.

7. The shaft deflection limiter of claim 6 wherein the member further comprises means for limiting deflection of the armature shaft relative to the arbor.

8. The shaft deflection limiter of claim 7 wherein said arbor and said armature shaft each have an axis of rotation, and said means for limiting deflection of the armature shaft relative to the arbor comprises a second aperture in said member, said apertures cooperating to maintain the axes of rotation aligned in parallel relationship, and said arbor being received in said second aperture.

9. The shaft deflection limiter of claim 8 wherein the gear train includes a pinion gear and a spur gear, each said gear being fixedly connected to a respective one of said armature shaft and arbor for rotation therewith.

10. In a gear drive for direct connected power driven units, the combination of a housing having an interior chamber, a driving shaft and a driven shaft each having an axis of rotation, the axes of rotation of said shafts being generally parallel to one another, and each said shaft having a first end portion supported in a respective stationary bearing in said chamber and a second end portion, support means for positioning the second end portion of said driven shaft relative to and spaced from said housing, the second end portion of said driving shaft being overhung beyond its bearing in cantilever, the second end portion of said driving shaft being unobstructed axially at all times in a direction of the cantilever thereof, a geared driving connection between said second end portions, and limit means, normally out of contact with the driving shaft, for limiting any lateral deflection of the driving shaft axially thereof only of the overhung portion of said driving shaft to counteract torque resulting from the driving connection between the shafts.

11. The gear drive as claimed in claim 10 wherein said support means comprises a plate located within the interior chamber of said housing and disposed in a plane transverse to the axes of rotation of said shafts, and said limit means comprises an axial pin extending from one of said driving shaft and plate, and a bore being provided in the other of said driving shaft and plate, the pin being disposed for movement within said bore.

12. The gear drive as claimed in claim 11 wherein said axial pin extends from said driving shaft, and said bore comprises an opening being formed in the plate.

13. In a gear drive for direct connected power driven units, a driving shaft rotatable about a first axis and having a first end portion supported in a stationary bearing and a second end portion overhung beyond said bearing, a pinion gear fixedly connected to the second end portion of said driving shaft for rotation therewith, a driven shaft rotatable about a second axis extending substantially parallel to the first axis, and a spur gear fixedly connected to an outer end portion of the driven shaft and meshing with said pinion gear, the improvement comprising a support wall which supports the end portion of said driven shaft, and a support member and a support socket formed, respectively, in one and the other of said support wall and the second end of said driving shaft, the support member being received in said support socket in a clearance fit with no portions of the second end of said driving shaft in engagement with the said support wall during normal loading conditions and said support socket limiting lateral deflection of the driving shaft to counter torque during abnormal loading conditions.

14. In a gear drive for direct connected power driven units, the combination of a housing having a support wall, a driving shaft and a driven shaft each having a first end portion and a second end portion disposed generally along its respective axis of rotation and the respective axes extending generally parallel to one another, each said shaft having the first end portion supported in a respective stationary bearing in said housing and a second end portion spaced from its stationary bearing, and a geared driving connection between the second end portions of said driving and driven shafts, the improvement wherein said housing includes a support wall which supports and prevents the second end portion of said driven shaft from moving in a direction transverse to the second end portion of said driving shaft, the second end portion of said driving shaft being unobstructed in an axial direction, at least during normal loading conditions, and means operably associating said driving shaft with said support wall for permitting the second end portion of said driving shaft to undergo only a predetermined amount of movement in a direction transverse to its axis of rotation whereby to counteract torques resulting from the driving connection between the shafts.

15. The gear drive as claimed in claim 14 wherein said means operably associating said driving shaft with said support wall comprises a socket and a pilot member associated with said support wall and the outer end portion of said driving shaft, said socket receiving said pilot member and limiting movement of the driving shaft away from its axis of rotation.

16. The gear drive as claimed in claim 15 wherein said socket is generally cylindrical with the cross-section thereof being defined by a first diameter, and said pilot member is generally cylindrical with and the cross-section thereof being defined by a second diameter, the second diameter being about 90% of the first diameter.

17. The gear drive as claimed in claim 15 wherein said pilot member extends from said driving shaft.

18. The gear drive as claimed in claim 17 wherein said socket comprises an opening in said support wall.

19. The gear drive as claimed in claim 14 wherein said geared driving connection comprises an axially extending pinion gear and helical spur gear disposed at a respective second end portion of said driving and driven shaft, the pinion gear having at least one tooth extending axially by a first amount to engage with respective gear teeth formed around the spur gear.

20. In a gear drive for direct connected power driven units, the combination of a housing having a housing wall and forming an interior chamber, a driving shaft and a driven shaft extending parallel to one another and disposed at least in part in said chamber, each said shaft having a first end portion supported in a respective stationary bearing in said chamber and a second end portion, a geared driving connection between said second end portions, the second end portion of said driving shaft being overhung beyond its stationary bearing and being unobstructed in an axial direction at all times, support means for fixedly positioning the second end portion of said driven shaft relative to said housing and limit means normally out of contact with any portion of said second end portion of the driving shaft for limiting the lateral deflection of the overhung portion of said driving shaft in a direction away from the second end portion of said driven shaft to counteract torque resulting from the driving connection between the shafts.

21. An attachment for a rotary powered device powered by an electric motor, comprising:
- a drive shaft extending axially as a cantilever from said motor and having an end portion which is unobstructed axially at all times and which is free to deflect transversely relative to the axis of rotation of said drive shaft;
- an arbor for driving a work implement of said rotary powered device;
- connecting means for coupling the deflectable end portion of said cantilevered drive shaft to said arbor and transmitting torque from the motor to drive the arbor;
- limit means for limiting deflection of the deflectable end portion of said drive shaft in a direction transverse to the axis of rotation of said drive.

22. The attachment according to claim 21 wherein said arbor is rotatable about a first axis and said drive shaft is rotatable about a second axis which is substantiating parallel to said first axis.

23. A rotary power handsaw comprising:
- a housing;
- a driven shaft positioned at least in part in said housing for rotating a saw blade;
- connecting means, including an armature shaft extending axially, for connecting said driven shaft to a rotary power source to drive said driven shaft, said armature shaft having a free end spaced axially from said power source, the free end being unobstructed axially at all times; and
- limit means, normally out of contact with the free end of said armature shaft to limit transverse deflection thereof caused by rotational torques operating to deflect the free end portion of the armature shaft from its driving connection with the driven shaft.

24. A power tool comprising:
- a housing;
- a motor including an armature shaft;
- a pinion bearing fixed in the housing;
- a pinion fixed to the shaft, rotatable about a pinion axis, and support in and extending outwardly as a cantilever from the pinion bearing, the pinion being unobstructed in the axial direction at all times;
- a gear drivable by the pinion and rotatable a gear axis parallel to and offset from the pinion axis; and
- a shaft deflection limiter formed on the armature shaft and the housing and comprising (1) a pilot and (2) a member containing an aperture surrounding the pilot and normally disengaged with the pilot during low loading of the motor and engageable with the pilot during high loading of the motor to limit deflection of the shaft.

25. The tool of claim 24 wherein:
the pilot is formed on the distal end of the armature shaft; and
the member is a bearing supported in the housing.

26. The tool of claim 24 wherein:
the pilot is formed on the distal end of the armature shaft; and
the member is a plate supported in the housing.

27. The tool of claim 24 wherein:
the pilot extends from a wall of the housing; and
the member is a bore formed in the distal end of the armature shaft.

\* \* \* \* \*